US010692507B2

(12) United States Patent
Rafii

(10) Patent No.: US 10,692,507 B2
(45) Date of Patent: Jun. 23, 2020

(54) METHODS AND APPARATUS TO PERFORM WINDOWED SLIDING TRANSFORMS

(71) Applicant: The Nielsen Company (US), LLC, New York, NY (US)

(72) Inventor: Zafar Rafii, Berkeley, CA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 15/899,220

(22) Filed: Feb. 19, 2018

(65) Prior Publication Data
US 2019/0259391 A1    Aug. 22, 2019

(51) Int. Cl.
*G10L 19/008* (2013.01)
*G06F 17/14* (2006.01)
*G10L 19/022* (2013.01)
*G10L 19/02* (2013.01)

(52) U.S. Cl.
CPC .......... *G10L 19/008* (2013.01); *G06F 17/141* (2013.01); *G10L 19/022* (2013.01); *G10L 19/0212* (2013.01)

(58) Field of Classification Search
CPC ........ G10L 19/022; G10L 25/45; G10L 25/18
See application file for complete search history.

(56) References Cited

U.S. PATENT DOCUMENTS

| | | | |
|---|---|---|---|
| 5,373,460 A * | 12/1994 | Marks, II | G06F 17/141 704/E11.002 |
| 6,820,141 B2 | 11/2004 | Bennett | |
| 7,742,737 B2 | 6/2010 | Peiffer | |
| 7,907,211 B2 | 3/2011 | Oostveen et al. | |
| 8,351,645 B2 | 1/2013 | Srinivasan | |
| 8,553,148 B2 | 10/2013 | Ramaswamy et al. | |
| 8,559,568 B1 | 10/2013 | Clark | |
| 8,639,178 B2 | 1/2014 | Anniballi et al. | |
| 8,768,713 B2 | 7/2014 | Chaoui et al. | |
| 8,825,188 B2 | 9/2014 | Stone et al. | |
| 8,856,816 B2 | 10/2014 | Falcon | |
| 9,049,496 B2 | 6/2015 | Raesig et al. | |
| 9,313,359 B1 | 4/2016 | Stojancic et al. | |
| 9,456,075 B2 | 9/2016 | Ponting et al. | |

(Continued)

FOREIGN PATENT DOCUMENTS

| | | |
|---|---|---|
| GB | 2474508 | 4/2011 |
| WO | 2019084065 A1 | 5/2019 |

OTHER PUBLICATIONS

Todd et al., "AC-3: Flexible Perceptual Coding for Audio Transmission and Storage", presented at the 96th Convention of the Audio Engineering Society, Feb. 26-Mar. 1, 1994, 13 pages.

(Continued)

*Primary Examiner* — Brian L Albertalli
(74) *Attorney, Agent, or Firm* — Hanley, Flight & Zimmerman, LLC

(57) ABSTRACT

Methods and apparatus to perform windowed sliding transforms are disclosed. An example apparatus includes a transformer to transform a first block of time-domain samples of an input signal into a first frequency-domain representation based on a second frequency-domain representation of a second block of time-domain samples of the input signal, and a windower to apply a third frequency-domain representation of a time-domain window function to the first frequency-domain representation.

19 Claims, 5 Drawing Sheets

(56) References Cited

U.S. PATENT DOCUMENTS

| | | | |
|---|---|---|---|
| 9,515,904 | B2 | 12/2016 | Besehanic et al. |
| 9,641,892 | B2 | 5/2017 | Panger et al. |
| 9,648,282 | B2 | 5/2017 | Petrovic et al. |
| 9,837,101 | B2 | 12/2017 | Bilobrov |
| 2003/0026201 | A1 | 2/2003 | Arnesen |
| 2003/0086341 | A1 | 5/2003 | Wells et al. |
| 2005/0015241 | A1 | 1/2005 | Baum |
| 2006/0025993 | A1 | 2/2006 | Aarts et al. |
| 2008/0169873 | A1 | 7/2008 | Toda |
| 2014/0137146 | A1 | 5/2014 | Topchy et al. |
| 2014/0336800 | A1 | 11/2014 | Radhakrishnan et al. |
| 2015/0170660 | A1 | 6/2015 | Han et al. |
| 2015/0222951 | A1 | 8/2015 | Ramaswamy |
| 2015/0302086 | A1 | 10/2015 | Roberts et al. |
| 2016/0196343 | A1 | 7/2016 | Rafii |
| 2017/0048641 | A1* | 2/2017 | Franck .................... H04S 3/004 |
| 2017/0337926 | A1 | 11/2017 | Chon et al. |
| 2018/0315435 | A1* | 11/2018 | Goodwin .............. G10L 19/022 |
| 2018/0365194 | A1* | 12/2018 | Grado ................... G06F 17/147 |
| 2019/0122673 | A1 | 4/2019 | Rafii et al. |
| 2019/0139559 | A1 | 5/2019 | Rafii et al. |

OTHER PUBLICATIONS

Brandenburg et al.,"ISO-MPEG-1 Audio: A Generic Standard for Coding of High-Quality Digital Audio", presented at the 92 Convention of the Audio Engineering Society, 1992; revised Jul. 15, 1994, 13 pages.

Brandenburg, Karlheinz, "MP3 and AAC Explained", presented at the Audio Engineering Society's 17th International Conference on High Quality Audio Coding, Sep. 2-5, 1999, 12 pages.

Herre et al., "Analysis of Decompressed Audio—The "Inverse Decoder"", presented at the 109th Convention of the Audio Engineering Society, Sep. 22-25, 2000, 24 pages.

Moehrs et a.l, "Analysing decompressed audio with the "Inverse Decoder"—towards an operative algorithm", presented at the 112the Convention of the Audio Engineering Society, May 10-13, 2002, 22 pages.

Bosi et al., "Introduction to Digital Audio Coding and Standards", published by Kluwer Academic Publishers, 2003, 426 pages.

Yang et al., "Detecting Digital Audio Forgeries by Checking Frame Offsets", presented at the 10th annual ACM Multimedia & Security Conference, Sep. 22-23, 2008, 6 pages.

D'Alessandro et al., "MP3 Bit Rate Quality Detection through Frequency Spectrum Analysis", presented at the 11th annual ACM Multimedia & Security Conference, Sep. 7-8, 2009, 5 pages.

Yang et al., "Defeating Fake-Quality MP3", presented at the 11th annual ACM Multimedia & Security Conference, Sep. 7-8, 2009, 8 pages.

Liu et al., "Detection of Double MP3 Compression", published in Cognitive Computation, May 22, 2010, 6 pages.

Hiçsönmez et al., "Audio Codec Identification Through Payload Sampling", published in Information Forensics and Security (WIFS), 2011, 6 pages.

Advanced Television Systems Committee, "ATSC Standard: Digital Audio Compression (AC-3, E-AC-3)", Dec. 17, 2012, 270 pages.

Hiçsönmez et al., "Methods for Identifying Traces of Compression in Audio", published online, URL: https://www.researchgate.net/publication/26199644, May 1, 2014, 7 pages.

Bianchi et al., "Detection and Classification of Double Compressed MP3 Audio Tracks", presented at the 1st annual AMC workshop on Information Hiding & Multimedia Security, Jun. 17-19, 2013, 6 pages.

Qiao et al., "Improved Detection of MP3 Double Compression using Content-Independent Features", published in Signal Processing, Communication and Computing (ICSPCC), 2013, 4 pages.

Korycki, Rafal, "Authenticity examination of compressed audio recordings using detection of multiple compression and encoders' identification", published in Forensic Science International, Feb. 7, 2014, 14 pages.

Gärtner et al., "Efficient Cross-Codec Framing Grid Analysis for Audio Tampering Detection", presented at the 136th Audio Engineering Society Convention, Apr. 26-29, 2014, 11 pages.

Luo et al., "Identifying Compression History of Wave Audio and Its Applications", published in ACM Transactions on Multimedia Computing, Communications and Applications, vol. 10, No. 3, Article 30, Apr. 2014, 19 pages.

xiph.org Foundation, "Vorbis I Specification", published Feb. 27, 2015, 74 pages.

Seichter et al., "AAC Encoding Detection and Bitrate Estimation Using a Convolutional Neural Network", published in Acoustics, Speech and Signal Processing (ICASSP), 2016, 5 pages.

Hennequin et al., "Codec Independent Lossy Audio Compression Detection", published in Accoustics, Speech and Signal Processing (ICASSP), 2017, 5 pages.

Kim et al., "Lossy Compression Identification from Audio Recordings, version 1", 5 pages.

Kim et al., "Lossy Compression Identification from Audio Recordings, version 2", 5 pages.

Barry Van Oudtshoorn, "Investigating the Feasibility of Near Real-Time Music Transcription on Mobile Devices," Honours Programme of the School of Computer Science and Software enginnering, The University of Western Australia, 2008, 50 pages.

Eric Jacobsen and Richard Lyons, "Sliding Spectrum Analysis," Streamlining digital Signal Processing: A Tricks of the Trade Guidebook, IEEE, Chapter 14, 2007, 13 pages.

Eric Jacobsen and Richard Lyons, "An update to the sliding DFT," IEEE Signal Processing Magazine, 2004, 3 pages.

Eric Jacobsen and Richard Lyons, "The Sliding DFT," IEEE Signal Processing Magazine, 1053-5888, Mar. 2003, p. 74-80, 7 pages.

Haitham Hassanieh, Piotr Indyk, Dina Katabi, and Eric Price, "Simple and Practical Algorithm for Sparse Fourier Transform," SODA '12 Proceedings of the Twenty-Third Annual Symposium on Discrete Algorithms, 12 pages.

Judith C. Brown and Miller S. Puckette, "An efficient algorithm for the calculation of a constant Q transform," J. Acoust. Soc. Am. 92 (5), Nov. 1992, pp. 2698-2701, 4 pages.

Judith C. Brown, "Calculation of a constant Q spectral transform," J. Acoust. Soc. Am. 89 (1), Jan. 1991, pp. 425-434, 10 pages.

Steve Arar, "DFT Leakage and the Choice of the Window Function," Aug. 23, 2017, retrieved from www.allaboutcircuits.com/technical-articles, 11 pages.

Tom Springer, "Sliding FFT computes frequency spectra in real time," EDN Magazine, Sep. 29, 1988, reprint taken from Electronic Circuits, Systems and Standards: The Best of EDN, edited by Ian Hickman, 1991, 7 pages.

Kim et al., "Lossy Audio Compression Identification," 26th European Signal Processing Conference (EUSIPCO 2018), Rome, Italy, Sep. 3-7, 2018 (5 pages).

Kim et al., "Lossy Audio Compression Identification," 26th European Signal Processing Conference (EUSIPCO 2018), Rome, Italy, Sep. 3-7, 2018 (1 page).

International Searching Authority, "International Search Report," issued in connection with application No. PCT/US2018/057183, dated Feb. 13, 2019, 5 pages.

International Searching Authority, "Written Opinion," issued in connection with application No. PCT/US2018/057183, dated Feb. 13, 2019, 4 pages.

United States Patent and Trademark Office, "Non-Final Office Action," dated Feb. 26, 2019, in connection with U.S. Appl. No. 15/793,543 (14 pages).

Hicsonmez et al. "Audio Codec Identification from Coded and Transcoded Audios," Digital Signal Processing 23.5, 2013: pp. 1720-1730 (11 pages).

Luo et al., "Identification of AMR decompressed audio," Digital Signal Processing vol. 37, 2015: pp. 85-91 (7 pages).

United States Patent and Trademark Office, "Non-Final Office Action," dated Jul. 19, 2019 in connection with U.S. Appl. No. 15/942,369 (46 pages).

Jenner et al., "High Accurate Non-Intrusive Speech Forensics for Codec Identifications from Observed Decoded Signals," 2012 IEEE International Conference on Acoustics, Speech and Signal Processing (ICASSP), IEEE 2012, pp. 1737-1740, 4 pages.

(56) References Cited

OTHER PUBLICATIONS

United States Patent and Trademark Office, "Final Office Action," dated Jul. 12, 2019, in connection with U.S. Appl. No. 15/793,543 (14 pages).
United States Patent and Trademark Office, "Notice of Allowance," issued in connection with U.S. Appl. No. 15/942,369, dated Dec. 13, 2019, 21 pages.
United States Patent and Trademark Office, "Notice of Allowance," issued in connection with U.S. Appl. No. 15/793,543, dated Mar. 25, 2020, 18 pages.
United States Patent and Trademark Office, "Supplemental Notice of Allowability," issued in connection with U.S. Appl. No. 15/942,369, dated Feb. 10, 2020, 2 pages.
United States Patent and Trademark Office, "Supplemental Notice of Allowability," issued in connection with U.S. Appl. No. 15/942,369, dated Mar. 17, 2020, 6 pages.

* cited by examiner

METHODS AND APPARATUS TO PERFORM WINDOWED SLIDING TRANSFORMS

FIELD OF THE DISCLOSURE

This disclosure relates generally to transforms, and, more particularly, to methods and apparatus to perform windowed sliding transforms.

BACKGROUND

The sliding discrete Fourier transform (DFT) is a method for efficiently computing the N-point DFT of a signal starting at sample m using the N-point DFT of the same signal starting at the previous sample m−1. The sliding DFT obviates the conventional need to compute a whole DFT for each starting sample.

Figure 1:
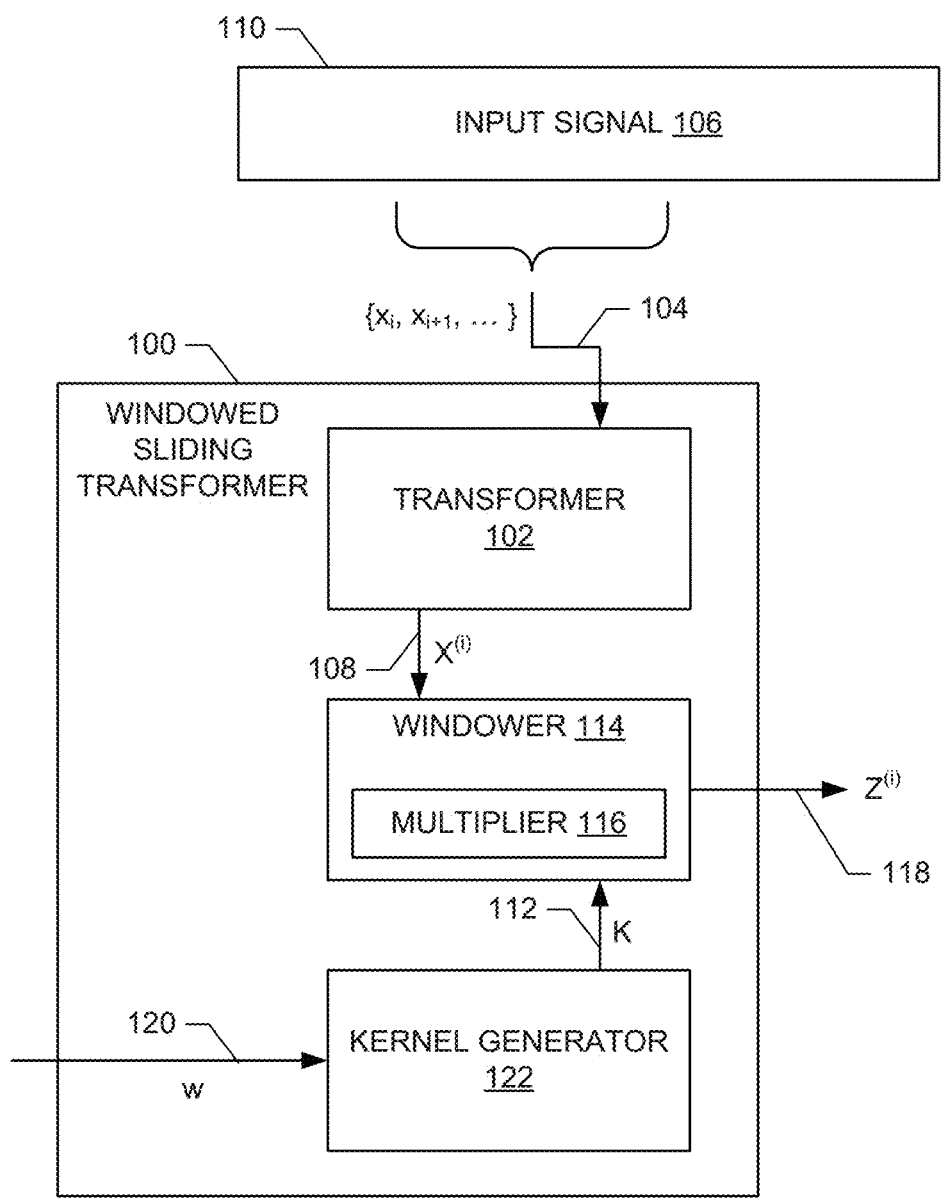
FIG. 1 illustrates an example windowed sliding transformer constructed in accordance with teachings of this disclosure.

In general, the same reference numbers will be used throughout the drawing(s) and accompanying written description to refer to the same or like parts. Connecting lines and/or connections shown in the various figures presented are intended to represent example functional relationships, physical couplings and/or logical couplings between the various elements.

DETAILED DESCRIPTION

Sliding transforms are useful in applications that require the computation of multiple DFTs for different portions, blocks, etc. of an input signal. For example, sliding transforms can be used to reduce the computations needed to compute transforms for different combinations of starting samples and window functions. For example, different combinations of starting samples and window functions can be used to identify the compression scheme applied to an audio signal as, for example, disclosed in U.S. patent application Ser. No. 15/793,543, filed on Oct. 25, 2017. The entirety of U.S. patent application Ser. No. 15/793,543 is incorporated herein by reference. Conventional solutions require that an entire DFT be computed after each portion of the input signal has had a window function applied. Such solutions are computationally inefficient and/or burdensome. In stark contrast, windowed sliding transformers are disclosed herein that can obtain the computational benefit of sliding transforms even when a window function is to be applied.

Reference will now be made in detail to non-limiting examples, some of which are illustrated in the accompanying drawings.

Figure 2:
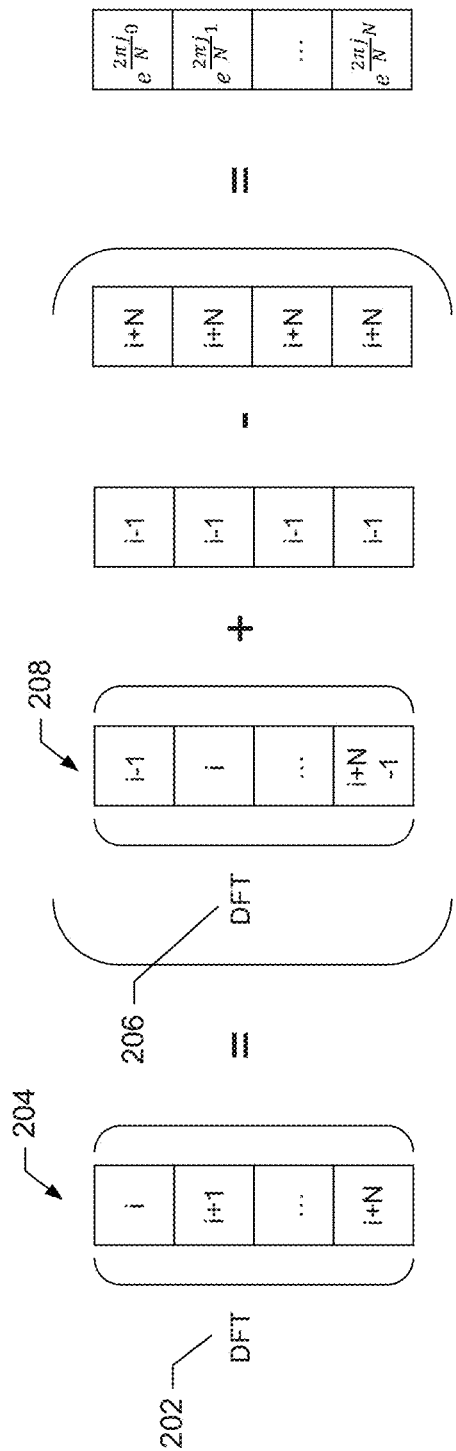
FIG. 2 illustrates an example operation of the example transformer of FIG. 1.

FIG. 1 illustrates an example windowed sliding transformer 100 constructed in accordance with teachings of this disclosure. To compute a transform (e.g., a time-domain to frequency-domain transform), the example windowed sliding transformer 100 of FIG. 1 includes an example transformer 102. The example transformer 102 of FIG. 1 computes a transform of a portion 104 (e.g., a block, starting with a particular sample, etc.) of an input signal 106 (e.g., of time-domain samples) to form a transformed representation 108 (e.g., a frequency-domain representations) of the portion 104 of the input signal 106. Example input signals 106 include an audio signal, an audio portion of a video signal, etc. Example transforms computed by the transformer 102 include, but are not limited to, a DFT, a sliding DFT, a modified discrete cosine transform (MDCT)), a sliding MDCT, etc. In some examples, the transforms are computed by the transformer 102 using conventional implementations of transforms. For example, the sliding N-point DFT $X^{(i)}$ 108 of an input signal x 106 starting from sample i from the N-point DFT $X^{(i-1)}$ of the input signal x 106 starting from sample i−1 can be expressed mathematically as:

$$X_k^{(i)} = (X_k^{(i-1)} - x_{i-1} + x_{i+n-1})e^{\frac{j2\pi k}{N}}, \quad 0 \le k < N \qquad \text{EQN (1)}$$

where the coefficients $$e^{\frac{2j\pi k}{N}}$$

are fixed values. An example operation of the example transformer 102 of FIG. 1 implemented the example sliding DFT of EQN (1) is shown in FIG. 2. As shown in FIG. 2, a first frequency-domain representation DFT $X^{(i)}$ 202 of a first block of time domain samples 204 $\{x_i \ldots x_{i+N}\}$ is based on the second frequency-domain representation DFT $X^{(i-1)}$ 206 of a second block of time domain samples 208 $\{x_{i-1} \ldots x_{i+N-1}\}$.

Conventionally, the DFT $Z^{(i)}$ of a portion of an input signal x after the portion has been windowed with a window function w is computed using the following mathematical expression:

$$Z_k^{(i)} = \sum_{n=0}^{N-1} x_{i+n} w_n e^{\frac{-j2\pi nk}{N}}. \quad 0 \le k < N \qquad \text{EQN (2)}$$

Accordingly, an entire DFT must be computed for each portion of the input signal in known systems.

In some examples, the input signal 106 is held (e.g., buffered, queued, temporarily held, temporarily stored, etc.) for any period of time in an example buffer 110.

When EQN (2) is rewritten according to teachings of this disclosure using Parseval's theorem, as shown in the mathematical expression of EQN (3), the window function w is expressed as a kernel $K_{k,k'}$ 112, which can be applied to the transformed representation $X^{(i)}$ 108 of the portion 104.

$$Z_k^{(i)} = \sum_{k'=0}^{N-1} X_{k'}^{(i)} K_{k,k'}. \quad 0 \le k < N \qquad \text{EQN (3)}$$

In EQN (3), the transformed representation $X^{(i)}$ 108 of the portion 104 can be implemented using the example sliding DFT of EQN (1), as shown in EQN (4).

$$Z_k^{(i)} \atop 0 \le k < N = \sum_{k'=0}^{N-1} [(X_{k'}^{(i-1)} - x_{i-1} + x_{i+n-1})e^{\frac{j2\pi k'}{N}}]K_{k,k'}, \quad \text{EQN (4)}$$

where the coefficients $$e^{\frac{2j\pi k}{N}}$$

and the kernel $K_{k,k'}$ 112 are fixed values. In stark contrast to conventional solutions, using EQN (4) obviates the requirement for a high-complexity transform to be computed for each portion of the input. In stark contrast, using EQN (4), a low-complexity sliding transform together with a low-complexity application of the kernel $K_{k,k'}$ 112 is provided.

To window the transformed representation 108, the example windowed sliding transformer 100 of FIG. 1 includes an example windower 114. The example windower 114 of FIG. 1 applies the kernel $K_{k,k'}$ 116 to the transformed representation 108 to form windowed transformed data 118. As shown in EQN (3) and EQN (4), in some examples, the windower 114 applies the kernel $K_{k,k'}$ 116 using an example multiplier 116 that performs a matrix multiplication of the transformed representation $X_{(i)}$ 108 of the portion 104 with the kernel $K_{k,k'}$ 112, as shown in the example graphical depiction of FIG. 3.

To window the transformed representation 108, the example windowed sliding transformer 100 of FIG. 1 includes an example windower 114. The example windower 114 of FIG. 1 applies a kernel 112 to the transformed representation 108 to form windowed transformed data 118. Conventionally, a DFT of the portion 104 after it has been windowed with a window function 120 would be computed, as expressed mathematically below in EQN (2)). When the sliding DFT of EQN (1) is substituted into the mathematical expression of EQN (3), the combined operations of the transformer 102 and the windower 114 can be expressed mathematically as:

$$Z_k^{(i)} \atop 0 \le k < N = \sum_{k'=0}^{N-1} [(X_{k'}^{(i-1)} - x_{i-1} + x_{i+n-1})e^{\frac{j2\pi k'}{N}}]K_{k,k'}, \quad \text{EQN (4)}$$

where the coefficients $$e^{\frac{2j\pi k}{N}}$$

and $K_{k,k'}$ are fixed values.

To compute the kernel 112, the example windowed sliding transformer 100 includes an example kernel generator 122. The example kernel generator 122 of FIG. 1 computes the kernel 112 from the window function 120. In some examples, the kernel generator 122 computes the kernel $K_{k,k'}$ 112 using the following mathematical expression:

$$K_{k,k'} \atop {0 \le k < N \atop 0 \le k' < N} = \frac{1}{N}\overline{\mathcal{F}\left(\overline{w_n}e^{\frac{j2\pi nk}{N}}\right)}, \quad \text{EQN (5)}$$

where $\mathcal{F}(\ )$ is a Fourier transform. The kernel $K_{k,k'}$ 112 is a frequency-domain representation of the window function w 120. The example windower 114 applies the frequency-domain representation $K_{k,k'}$ 112 to the frequency-domain representation $X^{(i)}$ 108. The kernel $K_{k,k'}$ 112 needs to be computed only once and, in some examples is sparse. Accordingly, not all of the computations of multiplying the transformed representation $X^{(i)}$ and the kernel $K_{k,k'}$ 112 in EQN (3) and EQN (4) need to be performed. In some examples, the sparseness of the kernel $K_{k,k'}$ 112 is increased by only keeping values that satisfy (e.g., are greater than) a threshold. Example windows 120 include, but are not limited to, the sine, slope and Kaiser-Bessel-derived (KBD) windows.

References have been made above to sliding windowed DFT transforms. Other forms of sliding windowed transforms can be implemented. For example, the sliding N-point MDCT $Y^{(i)}$ 108 of an input signal x 106 starting from sample i from the N-point DFT $X^{(i-1)}$ of the input signal x 106 starting from sample i−1 can be expressed mathematically as:

$$Y_k^{(i)} \atop 0 \le k < \frac{N}{2} = \sum_{k'=0}^{N-1} [(X_{k'}^{(i-1)} - x_{i-1} + x_{i+n-1})e^{\frac{j2\pi k'}{N}}]K_{k,k'}, \quad \text{EQN (6)}$$

where the kernel $K_{k,k'}$ 112 is computed using the following mathematical expression:

$$K_{k,k'} \atop {0 \le k < N/2 \atop 0 \le k' < N} = \frac{1}{2}\overline{DFT\left(\overline{w_n}\cos\left[\frac{J2\pi}{N}\left(n + \frac{1}{2} + \frac{N}{4}\right)\left(k + \frac{1}{2}\right)\right]\right)}, \quad \text{EQN (7)}$$

In another example, the sliding N-point complex MDCT $Z^{(i)}$ 108 of an input signal x 106 starting from sample i from the N-point DFT $X^{(i-1)}$ of the input signal x 106 starting from sample i−1 can be expressed mathematically as:

$$Z_k^{(i)} \atop 0 \le k < \frac{N}{2} = \sum_{k'=0}^{N-1} [(X_{k'}^{(i-1)} - x_{i-1} + x_{i+n-1})e^{\frac{j2\pi k'}{N}}]K_{k,k'}, \quad \text{EQN (8)}$$

where the kernel $K_{k,k'}$ 112 is computed using the following mathematical expression:

$$K_{k,k'} \atop {0 \le k < N/2 \atop 0 \le k' < N} = \frac{1}{N}\overline{DFT\left(\overline{w_n}e^{\frac{J2\pi}{N}\left(n+\frac{1}{2}+\frac{N}{4}\right)\left(k+\frac{1}{2}\right)}\right)}, \quad \text{EQN (9)}$$

While an example manner of implementing the example windowed sliding transformer 100 is illustrated in FIGS. 1 and 2, one or more of the elements, processes and/or devices illustrated in FIGS. 1 and 2 may be combined, divided, re-arranged, omitted, eliminated and/or implemented in any other way. Further, the example transformer 102, the example windower 114, the example multiplier 116, the example kernel generator 114 and/or, more generally, the example windowed sliding transformer 100 of FIGS. 1 and 2 may be implemented by hardware, software, firmware and/or any combination of hardware, software and/or firmware. Thus, for example, any of the example transformer 102, the example windower 114, the example multiplier 116, the example kernel generator 114 and/or, more generally, the example windowed sliding transformer 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transformer 102, the example windower 114, the example multiplier 116, the example kernel generator 114 and/or the example windowed sliding transformer 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example windowed sliding transformer 1100 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
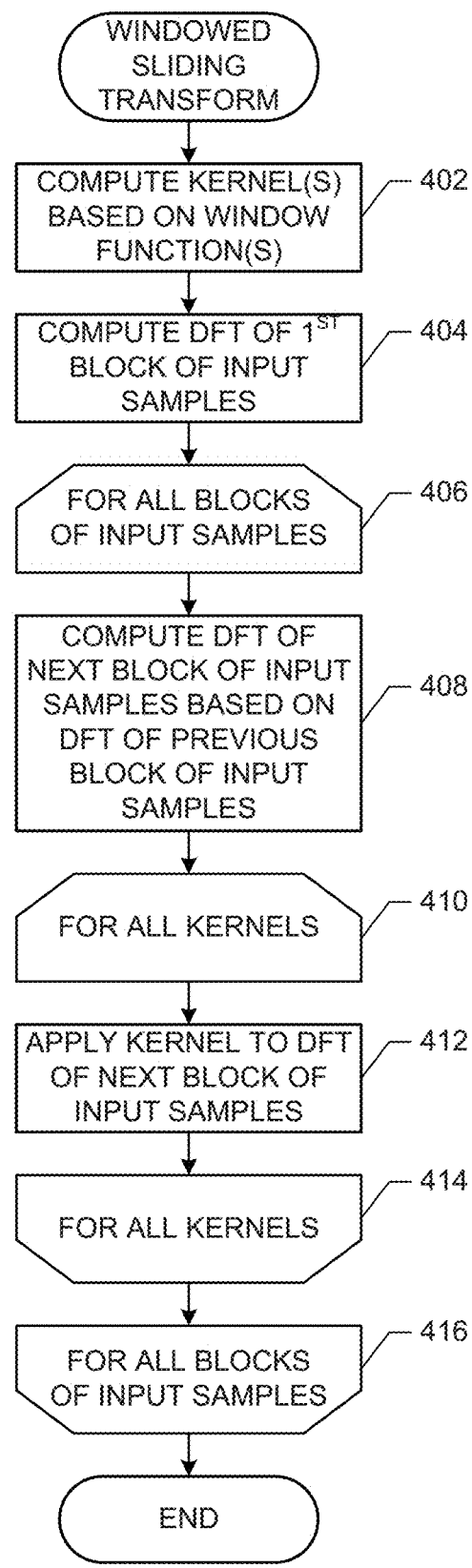
FIG. 4 is a flowchart representative of example hardware logic and/or machine-readable instructions for implementing the example windowed sliding transformer of FIG. 1.

A flowchart representative of example hardware logic or machine-readable instructions for implementing the windowed sliding transformer 100 is shown in FIG. 4. The machine-readable instructions may be a program or portion of a program for execution by a processor such as the processor 510 shown in the example processor platform 500 discussed below in connection with FIG. 5. The program may be embodied in software stored on a non-transitory computer-readable storage medium such as a compact disc read-only memory (CD-ROM), a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flowchart illustrated in FIG. 4, many other methods of implementing the example windowed sliding transformer 100 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, a field programmable gate array (FPGA), an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The program of FIG. 4 begins at block 402 where the example kernel generator 122 computes a kernel $K_{k,k'}$ 112 for each window function w 120 being used, considered, etc. by implementing, for example, the example mathematical expression of EQN (5). For example, implementing teaching of this disclosure in connection with teachings of the disclosure of U.S. patent application Ser. No. 15/793,543, filed on Oct. 25, 2017, a DFT transform can be efficiently computed for multiple window functions w 120 to identify the window function w 120 that matches that used to encode the input signal 106. As demonstrated in EQN (4), multiple window functions w 120 can be considered without needing to recompute a DFT.

The transformer 102 computes a DFT 108 of a first block 104 of samples of an input signal 106 (block 404). In some examples, the DFT 108 of the first block 104 is a conventional DFT. For all blocks 104 of the input signal 106 (block 406), the transformer 102 computes a DFT 108 of each block 104 based on the DFT 108 of a previous block 106 (block 408) by implementing, for example, the example mathematical expression of EQN (4).

For all kernels $K_{k,k'}$ 112 computed at block 402 (block 410), the example windower 114 applies the kernel $K_{k,k'}$ 112 to the current DFT 108 (block 412). For example, the example multiplier 116 implements the multiplication of the kernel $K_{k,k'}$ 112 and the DFT 108 shown in the example mathematical expression of EQN (3).

Figure 3:
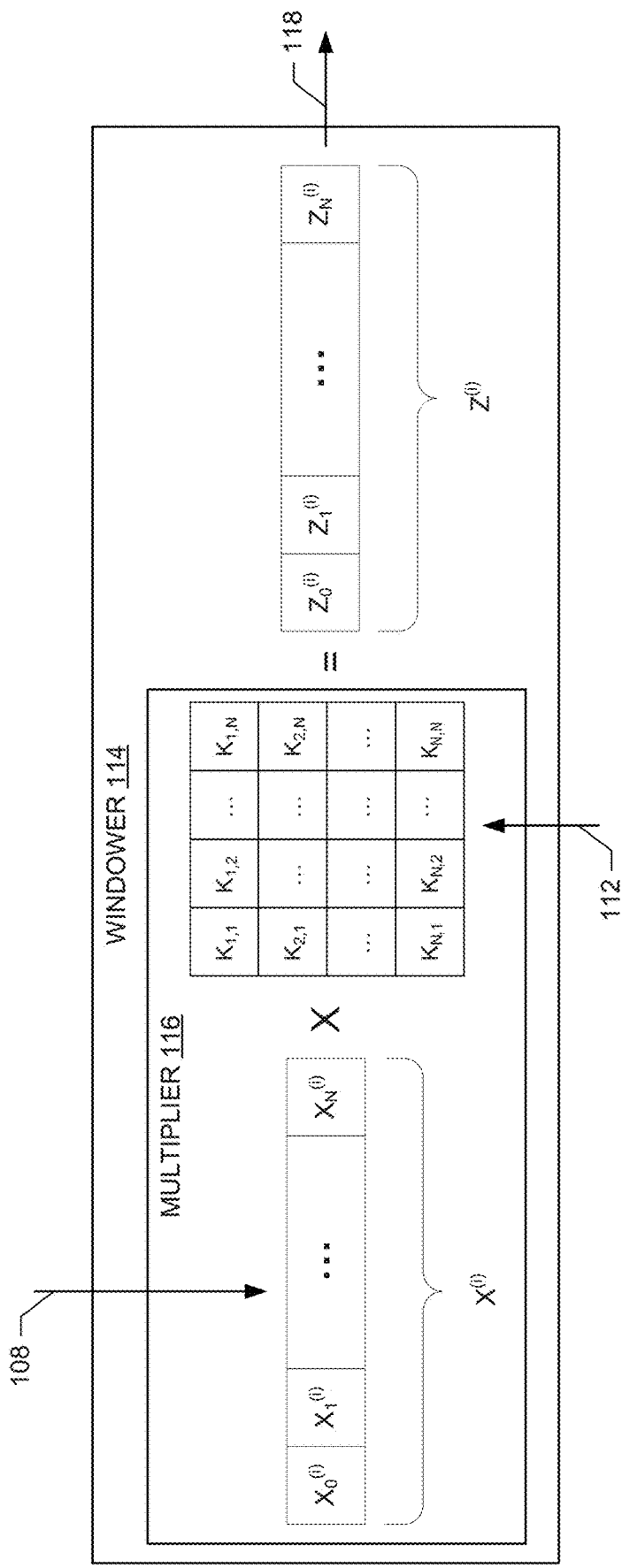
FIG. 3 illustrates an example operation of the example windower of FIG. 1.

When all kernels $K_{k,k'}$ 112 and blocks 104 have been processed (blocks 414 and 416), control exits from the example program of FIG. 3.

In U.S. patent application Ser. No. 15/793,543 it was disclosed that it was advantageously discovered that, in some instances, different sources of streaming media (e.g., NETFLIX®, HULU®, YOUTUBE®, AMAZON PRIME®, APPLE TV®, etc.) use different audio compression configurations to store and stream the media they host. In some examples, an audio compression configuration is a set of one or more parameters that define, among possibly other things, an audio coding format (e.g., MP1, MP2, MP3, AAC, AC-3, Vorbis, WMA, DTS, etc.), compression parameters, framing parameters, etc. Because different sources use different audio compression, the sources can be distinguished (e.g., identified, detected, determined, etc.) based on the audio compression applied to the media. The media is de-compressed during playback. In some examples, the de-compressed audio signal is compressed using different trial audio compression configurations for compression artifacts. Because compression artifacts become detectable (e.g., perceptible, identifiable, distinct, etc.) when a particular audio compression configuration matches the compression used during the original encoding, the presence of compression artifacts can be used to identify one of the trial audio compression configurations as the audio compression configuration used originally. After the compression configuration is identified, the AME can infer the original source of the audio. Example compression artifacts are discontinuities between points in a spectrogram, a plurality of points in a spectrogram that are small (e.g., below a threshold, relative to other points in the spectrogram), one or more values in a spectrogram having probabilities of occurrence that are disproportionate compared to other values (e.g., a large number of small values), etc. In instances where two or more sources use the same audio compression configuration and are associated with compression artifacts, the audio compression configuration may be used to reduce the number of sources to consider. Other methods may then be used to distinguish between the sources. However, for simplicity of explanation the examples disclosed herein assume that sources are associated with different audio compression configurations.

An example system for computing compression artifacts uses the example windowed sliding transformer 100 of FIG. 1. To compute compression artifacts, the example system includes an example artifact computer. The example artifact computer detects small values (e.g., values that have been quantized to zero) in frequency-domain representations computed by the windowed sliding transformer 100. Small values in the frequency-domain representations represent compression artifacts, and are used, in some examples, to determine when a trial audio compression corresponds to the audio compression applied by an audio compressor. Example implementations of the example artifact computer, and example processing of the artifacts to identify codec format and/or source are disclosed in U.S. patent application Ser. No. 15/793,543.

In U.S. patent application Ser. No. 15/793,543, for each starting location, a time-frequency analyzer applies a time-domain window function, and then computes a full time-to-frequency transform. Such solutions may be computationally infeasible, complex, costly, etc. In stark contrast, applying teachings of this disclosure to implement the example time-frequency analyzer U.S. patent application Ser. No. 15/793,543 with the windowed sliding transform 100, as shown in FIG. 1, sliding transforms and low-complexity kernels can be used to readily compute compression artifacts for large combinations of codecs, window locations, codec parameter sets, etc. with low complexity and cost, making the teachings of U.S. patent application Ser. No. 15/793,543 feasible on lower complexity devices.

For example, computation of the sliding DFT of EQN (1) requires 2N additions and N multiplications (where N is the number of samples being processed). Therefore, the sliding DFT has a linear complexity of the order of N. By applying a time-domain window as the kernel $K_{k,k'}$ 112 after a sliding DFT as shown in EQN (4), the computational efficiency of the windowed sliding DFT is maintained. The complexity of the kernel $K_{k,k'}$ 112 is KN additions and SN multiplications, where S is the number of non-zero values in the kernel $K_{k,k'}$ 112. When S<<N (e.g., 3 or 5), the windowed sliding DFT remains of linear complexity of the order of N. In stark contrast, the conventional methods of computing a DFT and an FFT are of the order of $N^2$ and N log(N), respectively. Applying a conventional time-domain window function (i.e., applying the window on the signal before computing a DFT) will be at best of the order of N log(N) (plus some extra additions and multiplications) as the DFT needs to be computed for each sample. By way of comparison, complexity of the order of N is considered to be low complexity, complexity of the order of N log(N) is considered to be moderate complexity, and complexity of the order of $N^2$ is considered to be high complexity.

In some examples, the example program of FIG. 4 is modified by using the example artifact computer to compute one or more compression artifacts after the windower 114 applies the kernel $K_{k,k'}$ 112 at block 412. Through use of the windowed sliding transformer 100 in such examples, compression artifacts can be computed for large combinations of codecs, window locations, codec parameter sets, etc. with low complexity and cost.

Figure 5:
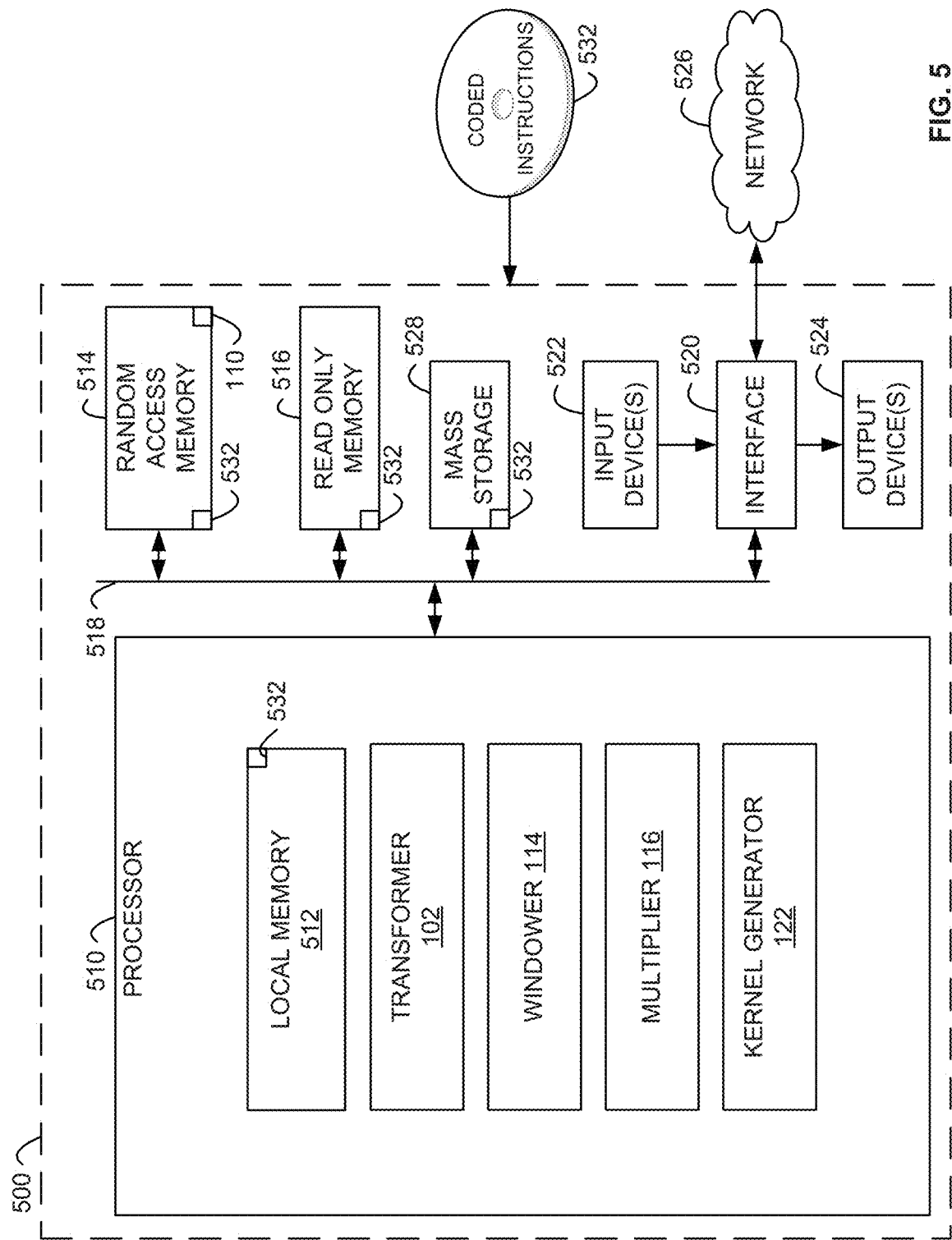
FIG. 5 illustrates an example processor platform structured to execute the example machine-readable instructions of FIG. 4 to implement the example windowed sliding transformer of FIG. 1.

FIG. 5 is a block diagram of an example processor platform 500 structured to execute the instructions of FIG. 3 to implement the windowed sliding transformer 100 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 510. The processor 510 of the illustrated example is hardware. For example, the processor 510 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example transformer 102, the example windower 114, the example multiplier 116, the example kernel generator 122, and the example artifact computer.

The processor 510 of the illustrated example includes a local memory 512 (e.g., a cache). The processor 510 of the illustrated example is in communication with a main memory including a volatile memory 514 and a non-volatile memory 516 via a bus 518. The volatile memory 514 may be implemented by Synchronous Dynamic Random-Access Memory (SDRAM), Dynamic Random-Access Memory (DRAM), RAMBUS® Dynamic Random-Access Memory (RDRAM®) and/or any other type of random access memory device. The non-volatile memory 516 may be implemented by flash memory and/or any other desired type of memory device. Access to the main memory 514, 516 is controlled by a memory controller. In the illustrated example, the volatile memory 514 implements the buffer 110.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a peripheral component interconnect (PCI) express interface.

In the illustrated example, one or more input devices 522 are connected to the interface circuit 520. The input device(s) 522 permit(s) a user to enter data and/or commands into the processor 510. The input device(s) can be implemented by, for example, an audio sensor, a microphone, a camera (still or video), a keyboard, a button, a mouse, a touchscreen, a track-pad, a trackball, isopoint and/or a voice recognition system. In some examples, an input device 522 is used to receive the input signal 106.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc. In some examples, input signals are received via a communication device and the network 526.

The processor platform 500 of the illustrated example also includes one or more mass storage devices 528 for storing software and/or data. Examples of such mass storage devices 528 include floppy disk drives, hard drive disks, CD drives, Blu-ray disk drives, redundant array of independent disks (RAID) systems, and DVD drives.

Coded instructions 532 including the coded instructions of FIG. 3 may be stored in the mass storage device 528, in the volatile memory 514, in the non-volatile memory 516, and/or on a removable non-transitory computer-readable storage medium such as a CD-ROM or a DVD.

From the foregoing, it will be appreciated that example methods, apparatus and articles of manufacture have been disclosed that lower the complexity and increase the efficiency of sliding windowed transforms. Using teachings of this disclosure, sliding windowed transforms can be computed using the computational benefits of sliding transforms even when a window function is to be implemented. From the foregoing, it will be appreciated that methods, apparatus and articles of manufacture have been disclosed which enhance the operations of a computer by improving the possibility to perform sliding transforms that include the application of window functions. In some examples, computer operations can be made more efficient based on the above equations and techniques for performing sliding windowed transforms. That is, through the use of these processes, computers can operate more efficiently by relatively quickly performing sliding windowed transforms. Furthermore, example methods, apparatus, and/or articles of manufacture disclosed herein identify and overcome inability in the prior art to perform sliding windowed transforms.

Example methods, apparatus, and articles of manufacture to sliding windowed transforms are disclosed herein. Further examples and combinations thereof include at least the following.

Example 1 is an apparatus, comprising a transformer to transform a first block of time-domain samples of an input signal into a first frequency-domain representation based on a second frequency-domain representation of a second block of time-domain samples of the input signal, and a windower to apply a third frequency-domain representation of a time-domain window function to the first frequency-domain representation.

Example 2 is the apparatus of example 1, wherein the windower includes a multiplier to multiply a vector including the first frequency-domain representation and a matrix including the third frequency-domain representation.

Example 3 is the apparatus of example 2, further including a kernel generator to compute the matrix by computing a transform of the time-domain window function.

Example 4 is the apparatus of example 3, wherein the kernel generator is to set a value of a cell of the matrix to zero based on a comparison of the value and a threshold.

Example 5 is the apparatus of any of examples 1 to 4, wherein the transformer computes the first frequency-domain representation based on the second frequency-domain representation using a sliding transform.

Example 6 is the apparatus of any of examples 1 to 5, further including a kernel generator to compute the third frequency-domain representation using a discrete Fourier transform, wherein the transformer computes the first frequency-domain representation based on the second frequency-domain representation using a sliding discrete Fourier transform, and wherein the windower includes a multiplier to multiply a vector including the first frequency-domain representation and a matrix including the third frequency-domain representation.

Example 7 is the apparatus of example 6, wherein the multiplication of the vector and the matrix by the multiplier implements an equivalent of a multiplication of the time-domain window function and the first block of time-domain samples.

Example 8 is the apparatus of any of examples 1 to 7, wherein the time-domain window function includes at least one of a sine window function, a slope window function, or a Kaiser-Bessel-derived window function.

Example 9 a method, comprising transforming a first block of time-domain samples of an input signal into a first frequency-domain representation based on a second frequency-domain representation of a second block of time-domain samples of the input signal, and applying a third frequency-domain representation of a time-domain window function to the first frequency-domain representation.

Example 10 is the method of example 9, wherein the applying the third frequency-domain representation of a time-domain window function to the first frequency-domain representation includes multiplying a vector including the first frequency-domain representation and a matrix including the third frequency-domain representation.

Example 11 is the method of example 10, further including transforming the time-domain window function to the third frequency-domain representation.

Example 12 is the method of example 11, further including setting a value of a cell of the matrix to zero based on a comparison of the value and a threshold.

Example 13 is the method of any of examples 9 to 12, wherein transforming the first block of time-domain into the first frequency-domain representation includes computing a sliding discrete Fourier transform.

Example 14 is the method of any of examples 9 to 13, wherein the time-domain window function includes at least one of a sine window function, a slope window function, or a Kaiser-Bessel-derived window function.

Example 15 is a non-transitory computer-readable storage medium comprising instructions that, when executed, cause a machine to transform a first block of time-domain samples of an input signal into a first frequency-domain representation based on a second frequency-domain representation of a second block of time-domain samples of the input signal, and apply a third frequency-domain representation of a time-domain window function to the first frequency-domain representation.

Example 16 is the non-transitory computer-readable storage medium of example 15, wherein the instructions, when executed, cause the machine to apply the third frequency-domain representation of the time-domain window function to the first frequency-domain representation by multiplying a vector including the first frequency-domain representation and a matrix including the third frequency-domain representation.

Example 17 is the non-transitory computer-readable storage medium of example 16, wherein the instructions, when executed, cause the machine to transform the time-domain window function to the third frequency-domain representation.

Example 18 is the non-transitory computer-readable storage medium of example 17, wherein the instructions, when executed, cause the machine to set a value of a cell of the matrix to zero based on a comparison of the value and a threshold.

Example 19 is the non-transitory computer-readable storage medium of any of examples 15 to 18, wherein the instructions, when executed, cause the machine to transform the first block of time-domain into the first frequency-domain representation by computing a sliding discrete Fourier transform.

Example 20 is the non-transitory computer-readable storage medium of any of examples 15 to 19, wherein the time-domain window function includes at least one of a sine window function, a slope window function, or a Kaiser-Bessel-derived window function.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a transformer to transform a first block of time-domain samples of an input signal into a first frequency-domain representation based on a second frequency-domain representation of a second block of time-domain samples of the input signal; and
   a windower to apply a third frequency-domain representation of a time-domain window function to the first frequency-domain representation, wherein the windower includes a multiplier to multiply a vector including the first frequency-domain representation and a matrix including the third frequency-domain representation, and wherein at least one of the transformer or the windower is implemented by a logic circuit.

2. The apparatus of claim 1, further including a kernel generator to compute the matrix by computing a transform of the time-domain window function.

3. The apparatus of claim 2, wherein the kernel generator is to set a value of a cell of the matrix to zero based on a comparison of the value and a threshold.

4. The apparatus of claim 1, wherein the transformer computes the first frequency-domain representation based on the second frequency-domain representation using a sliding transform.

5. The apparatus of claim 1,
   further including a kernel generator to compute the third frequency-domain representation using a discrete Fourier transform,
   wherein the transformer computes the first frequency-domain representation based on the second frequency-domain representation using a sliding discrete Fourier transform, and
   wherein the windower includes a multiplier to multiply a vector including the first frequency-domain representation and a matrix including the third frequency-domain representation.

6. The apparatus of claim 5, wherein the multiplication of the vector and the matrix by the multiplier implements an equivalent of a multiplication of the time-domain window function and the first block of time-domain samples.

7. The apparatus of claim 1, wherein the time-domain window function includes at least one of a sine window function, a slope window function, or a Kaiser-Bessel-derived window function.

8. A method, comprising:
   transforming a first block of time-domain samples of an input signal into a first frequency-domain representation based on a second frequency-domain representation of a second block of time-domain samples of the input signal; and
   applying a third frequency-domain representation of a time-domain window function to the first frequency-domain representation, wherein the applying the third frequency-domain representation of a time-domain window function to the first frequency-domain representation includes multiplying a vector including the first frequency-domain representation and a matrix including the third frequency-domain representation.

9. The method of claim 8, further including transforming the time-domain window function to the third frequency-domain representation.

10. The method of claim 9, further including setting a value of a cell of the matrix to zero based on a comparison of the value and a threshold.

11. The method of claim 8, wherein transforming the first block of time-domain into the first frequency-domain representation includes computing a sliding discrete Fourier transform.

12. The method of claim 8, wherein the time-domain window function includes at least one of a sine window function, a slope window function, or a Kaiser-Bessel-derived window function.

13. A non-transitory computer-readable storage medium comprising instructions that, when executed, cause a machine to:
    transform a first block of time-domain samples of an input signal into a first frequency-domain representation based on a second frequency-domain representation of a second block of time-domain samples of the input signal; and apply a third frequency-domain representation of a time-domain window function to the first frequency-domain representation, wherein the instructions, when executed, cause the machine to apply the third frequency-domain representation of the time-domain window function to the first frequency-domain representation by multiplying a vector including the first frequency-domain representation and a matrix including the third frequency-domain representation.

14. The non-transitory computer-readable storage medium of claim 13, wherein the instructions, when executed, cause the machine to transform the time-domain window function to the third frequency-domain representation.

15. The non-transitory computer-readable storage medium of claim 14, wherein the instructions, when executed, cause the machine to set a value of a cell of the matrix to zero based on a comparison of the value and a threshold.

16. The non-transitory computer-readable storage medium of claim 13, wherein the instructions, when executed, cause the machine to transform the first block of time-domain into the first frequency-domain representation by computing a sliding discrete Fourier transform.

17. The non-transitory computer-readable storage medium of claim 13, wherein the time-domain window function includes at least one of a sine window function, a slope window function, or a Kaiser-Bessel-derived window function.

18. An apparatus, comprising:
a transformer to transform a first block of time-domain samples of an input signal into a first frequency-domain representation based on a second frequency-domain representation of a second block of time-domain samples of the input signal, wherein the transformer computes the first frequency-domain representation based on the second frequency-domain representation using a sliding discrete Fourier transform;
a windower to apply a third frequency-domain representation of a time-domain window function to the first frequency-domain representation, wherein the windower includes a multiplier to multiply a vector including the first frequency-domain representation and a matrix including the third frequency-domain representation, and wherein at least one of the transformer or windower is implemented by a logic circuit; and
a kernel generator to compute the third frequency-domain representation using a discrete Fourier transform.

19. The apparatus of claim 18, wherein the multiplication of the vector and the matrix by the multiplier implements an equivalent of a multiplication of the time-domain window function and the first block of time-domain samples.

* * * * *